United States Patent
Dentinger et al.

(10) Patent No.: US 7,480,568 B2
(45) Date of Patent: *Jan. 20, 2009

(54) METHOD FOR ENCRYPTED AND UNENCRYPTED COOPERATIVE OPERATION

(75) Inventors: Michael P. Dentinger, Sunnyvale, CA (US); Kenneth M. Spratlin, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 11/520,951

(22) Filed: Sep. 13, 2006

(65) Prior Publication Data

US 2007/0106472 A1    May 10, 2007

(51) Int. Cl.
*G01S 1/00* (2006.01)
*G01S 3/02* (2006.01)

(52) U.S. Cl. .................. 701/213; 701/214; 701/200; 342/357.02

(58) Field of Classification Search .......... 701/200, 701/207, 213–215; 340/988; 342/350, 357.02, 342/357.06, 357.12
See application file for complete search history.

(56) References Cited

U.S. PATENT DOCUMENTS

| 6,031,488 A | 2/2000 | Hua et al. |
| 6,377,892 B1 | 4/2002 | Johnson et al. |
| 6,570,531 B1 | 5/2003 | Stratton |
| 6,577,951 B1 | 6/2003 | Johnson |
| 6,934,631 B2 * | 8/2005 | Dentinger et al. .......... 701/213 |
| 2005/0146459 A1 * | 7/2005 | Dentinger et al. ...... 342/357.01 |

OTHER PUBLICATIONS

Edwards A et al: "Military GPS Avionics Receivers for Civil Airspace Operations" Sep. 2002, pp. 2486-2497, XP002333683, Portland, OR, URL:www,ion.org>.
Happel, D et al., "Use of Military GPS in a Civil Environment", *Ion 59th Annual Meeting*, XP002357549 Alburquerque, (Jun. 25, 2003),57-64.
Wolfert, R. et al., "Direct P(Y)-code acquisition under a jamming environment". *IEEE Position Location and Navigation Symposium*, (Apr. 1998), 228-235.
Leary, W. "Crisis in the Blakans: The Lost Jet; Stealth Gives Plane Mask, But Not Cloak, Experts Say", *The New York Times*, (Apr. 1, 1999).

* cited by examiner

*Primary Examiner*—Yonel Beaulieu

(57) ABSTRACT

A method for standard positioning service (SPS) and precise positioning service (PPS) cooperative operation is disclosed. In one embodiment, a positioning signal is received. A PPS data portion of the positioning signal is acquired with PPS receiver. An SPS data portion of the positioning signal is acquired with an SPS receiver. The PPS receiver and the SPS receiver are then communicatively coupled. The PPS data portion from the PPS receiver is then cross-validated with the SPS data portion from the receiver, wherein the cross validation of the PPS data portion and the SPS data portion provides information about the validity of the positioning signal.

62 Claims, 6 Drawing Sheets

METHOD FOR ENCRYPTED AND UNENCRYPTED COOPERATIVE OPERATION

TECHNICAL FIELD

The present writing relates generally to positioning and navigation systems. More specifically, the present writing pertains to a system for implementing a precise positioning service global positioning receiver in cooperation with a standard position service global positioning receiver.

BACKGROUND ART

The aviation industry relies upon numerous navigation aids in order to safely take off, navigate enroute, and land aircraft. Such navigation aids (navaids) include, for example, the instrument landing system (ILS), very high frequency omnidirectional range (VOR) system, and the like. The survey industry also relied upon numerous location aids in order to ensure the most precise measurements are being performed. The Navstar Global Positioning System, hereafter referred to simply as GPS, is increasingly being accepted as an alternative to traditional navigation and survey aids. In addition to civilian applications, GPS is used extensively by the United States Department of Defense (DoD) to provide military users with highly accurate position, velocity, and time information.

GPS is a space-based radio positioning network for providing users equipped with suitable receivers highly accurate position, velocity, and time (PVT) information. Developed by the United States Department of Defense (DoD), the space-based portion of GPS comprises a constellation of GPS satellites in non-geosynchronous 12-hour orbits around the earth.

Prior art FIG. 1 shows the constellation 100 of GPS satellites 101 in orbit. The GPS satellites 101 are located in six orbital planes 102 with four of the GPS satellites 101 in each plane, plus a number of "on orbit" spare satellites (not shown) for redundancy. The orbital planes 102 of the GPS satellites 101 have an inclination of 55 degrees relative to the equator and an altitude of approximately 20,200 km (10,900 miles) and typically complete an orbit in approximately 12 hours. The positions of GPS satellites 101 are such that a minimum of five of the GPS satellites 101 are normally observable (above the horizon) by a user anywhere on earth at any given time.

GPS position determination is based upon a concept referred to as time of arrival (TOA). ranging. Each of the orbiting GPS satellites 101 broadcasts spread spectrum microwave signals encoded with positioning data and satellite ephemeris information. The signals are broadcast on two frequencies, L1 at 1575.42 MHz and L2 at 1227.60 MHz, modulated using bi-phase shift keying techniques. Essentially, the signals are broadcast at precisely known times and at precisely known intervals. The signals are encoded with their precise time of transmission. A user receives the signals with a GPS receiver designed to measure the time of arrival of the signals and to demodulate the satellite orbital data contained in the signals. Using the time of arrival data from multiple satellites, and multiplying this by the speed of light gives what is termed the pseudo range distance measurement to the various satellites. If the GPS receiver clock were perfect, this would be the range measurement for that satellite, but the imperfection of the clock causes it to differ by the time offset between actual time and receiver time. Thus, the measurement is called a pseudo range, rather than a range. However, the time offset is common to the pseudo range measurements of all the satellites. By determining the pseudo ranges of four or more satellites, the GPS receiver is able to determine its location in three dimensions, as well as the time offset. Thus, a user equipped with a proper GPS receiver is able to determine his PVT with great accuracy, and use this information to navigate safely and accurately from point to point, among such other uses as survey and mapping and vehicle tracking. For more information on how the GPS system works, see (Parkinson & Spilker).

DoD GPS applications require the most accurate PVT possible, which is obtained via encrypted P-code signals of the PPS. These applications also need to be secure from jamming, spoofing and other types of countermeasures. As is well known, PPS is a high accuracy (e.g., published specifications to 6 meters 2 DRMS horizontal, Circular Error Probable CEP, or 16 meters Spherical Error Probable SEP) service used by DoD authorized users (e.g., the military). PPS is based upon processing p-code signals modulated on both the L1 frequency and the L2 frequency. When encrypted, the P-code becomes known as Y-code, and must be decrypted after demodulation, necessitating the use of special crypto key equipment available only to DoD authorized users using specialized GPS receiver equipment.

The GPS system was conceived for military use first and foremost, but later was designated a dual-use system by President Ronald Reagan in 1983. That is because the military system, known as the precise Positioning System (PPS) uses a 10.23 MHz data rate for the coded signal, referred to as the Precise Code or P-code, while the Coarse Acquisition code, called the C/A code is generally used as an aid to acquire the P-code. The accuracy of the position fix from P-code is approximately lo times that available to un-enhanced C/A code civilian receivers. Since the introduction of commercial receivers in 1984 by Trimble Navigation Limited, the enhancements introduced for civilians have vastly outpaced those introduced for military applications. The military receivers have improved for their specific applications, but there are few if any PPS-based survey, mapping, or tracking applications incorporated in the SPS receivers.

The needs of military receivers and the needs of civilian receivers are thus quite different, and have never been integrated before. Thus there is a need to incorporate the features of various civilian receivers with military receivers so that the benefits of Commercial Off The Shelf (COTS) procurement practices can be obtained in equipment that meet military needs.

Prior Art FIG. 2 shows a typical prior art PPS receiver system 200. System 200 shows the specialized encryption receiver components utilized in generating the encrypted Y-code signal. As is well known in the art, a replica of the Y-code signal must be generated by a GPS receiver in order to acquire and track the Y-code signal transmitted from the respective GPS satellites. System 200 depicts the components required to generate the Y-code signal replica.

As shown in FIG. 2, system 200 includes a P-code generator 201 coupled to a Y-code generator 202 via line 204. Y-code generator 202 is coupled to a security module (e.g., PPS-SM, SAASM, or M-code engine) 208 via line 207. KDP 208 is also coupled to a CV 205 (crypto-variable) keying device and a computer system 211 via line 206 and line 209.

System 200 functions by generating a Y-code replica for use by an incorporating GPS receiver in locking onto a transmitted Y-code signal from a GPS satellite. As is well known, a Y-code is generated by properly encrypting the P-code. P-code generator 201 generates a replica P-code. and couples this P-code to Y-code generator 202 via line 204. Y-code generator 202 encrypts this P-code using a data received from security module 208 via line 207. Y-code generator 202 generates the Y-code 210 by encrypting the P-code. The Y-code 210 is coupled to a DSP 220 where it is used to process Y-code signals received from the GPS satellites via antenna 222 and RF front end 221. The resulting positioning information is subsequently coupled to the computer system 211 via line 223. Security module 208 also couples Selective Availability (SA) data to computer system 211 via line 209 which allows the computer system 211 to cancel out the PVT errors due to selective availability (SA).

The security module 208 functions by generating the data used by Y-code generator 202. As is known by those skilled in the art, security module 208 generates the data by using a CV (crypto-variable) key 205. Thus, system 200 enables the incorporating GPS receiver to decode and process the encrypted Y-code signals from the GPS constellation.

Only users equipped with GPS receivers which incorporate Y-code hardware (e.g., security module 208, and Y-code generator 202) and which have current CV keys are able to process the Y-code signals. Consequently, access to the CV keys are very tightly controlled. In addition, the design of the encrypting hardware (security modules) is very tightly controlled. This high level of control greatly increases the cost of fielding and maintaining an inventory of PPS receivers.

In addition, current security module are typically implemented as chip sets of three or more discrete integrated circuits. Accordingly, the security module accounts for a significant portion of the cost of the PPS receiver. The multi chip security module implementation also increases the complexity of a PPS receiver, and the like. These are all disadvantages when the objective is to use highly accurate and cost effective PPS receivers in the military, especially in the case of disposable PPS receivers for use with PGMs.

Due to the complexity and associated cost of the PPS receiver, the technology of the PPS receiver is years behind that of the civilian SPS receiver. Therefore, most advances with GPS based technology occurs on the civilian (SPS) side of the GPS market. Due to the dissimilar advances in GPS technology, the SPS receiver is more technologically (e.g., software and hardware) advanced than that of the PPS receiver. That is, the SPS receiver may contain newer technology, require less power to function, and be able to operate more advanced software than that of the PPS receiver. However, the cost associated with developing many of the civilian features available for non-military users into PPS receivers is quite prohibitive, and would never lead to any cost effective solutions.

What is needed is a method for easily integrating SPS receiver systems with PPS receiver technology in a cooperative operation. What is also needed is a method for SPS and PPS cooperative operation which allows the better applications of the civilian SPS receiver to operate in the more challenged DoD environment of the PPS receiver. What is further required is a method which provides these advantages without compromising accuracy, integrity, or security. The present invention provides a novel solution to the above requirements.

DISCLOSURE

Embodiments presented herein provide a method for SPS and PPS cooperative operation. The embodiments also provide a method for SPS and PPS cooperative operation which allows the better applications of the civilian SPS receiver to operate in the more accurate DoD environment of the PPS receiver. The embodiments further provide a method which provides these advantages without compromising accuracy, integrity, or security.

In one embodiment, a method for standard positioning service (SPS) and precise positioning service (PPS) cooperative operation is disclosed. In one embodiment, a positioning signal is received. A PPS data portion of the positioning signal is acquired with a PPS receiver. An SPS data portion of the positioning signal is acquired with an SPS receiver. The PPS receiver and the SPS receiver are then communicatively coupled. The PPS data portion from the PPS receiver is then cross-validated with the SPS data portion from the SPS receiver, wherein the cross validation of the PPS data portion and the SPS data portion provides information about the validity of the SPS positioning signal operating in a PPS environment.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DETAILED DESCRIPTION

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "processing" or "decrypting" or "encrypting" or "decoding" or "encoding" or "acquiring" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
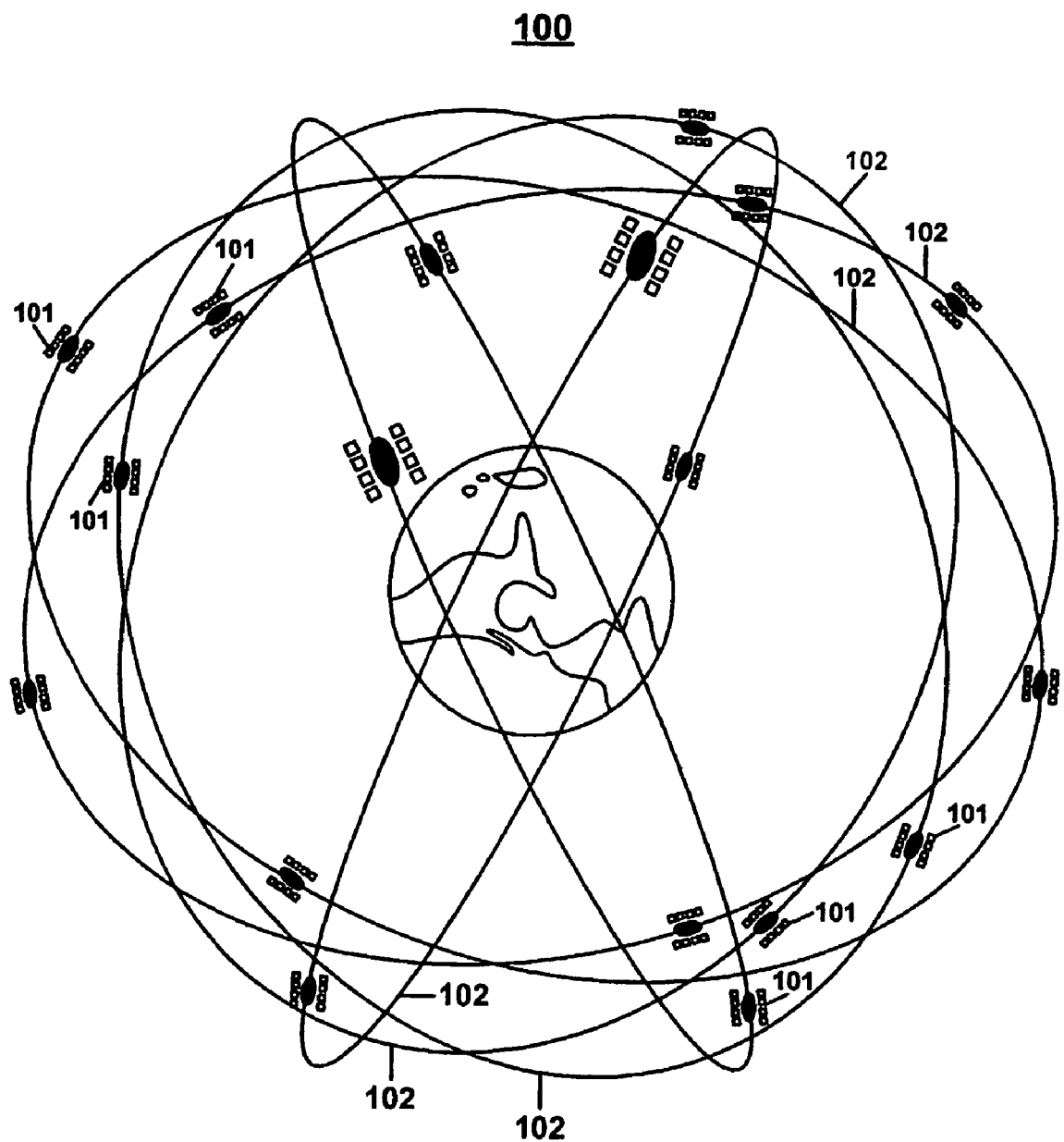
FIG. 1 shows a constellation of GPS satellites in orbit.
Figure 2:
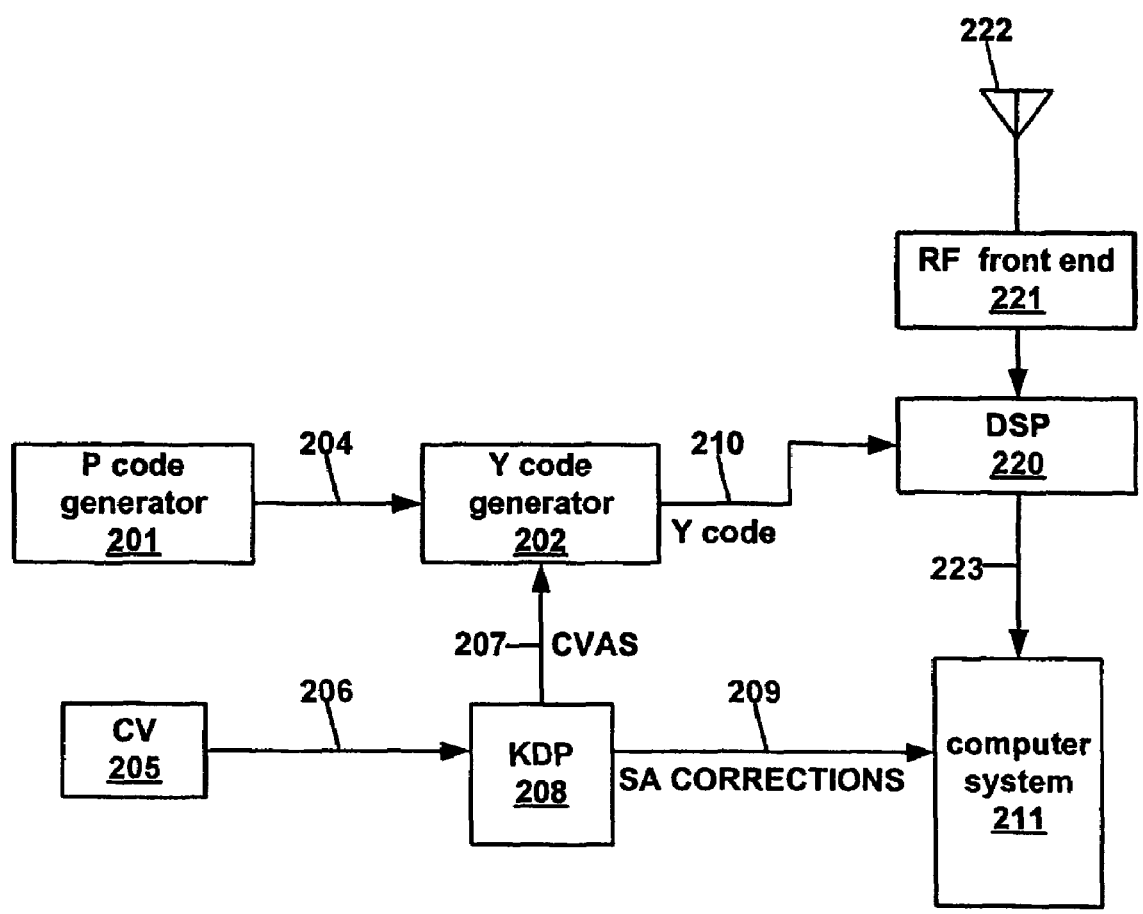
FIG. 2 shows a prior art PPS system.
Figure 3:
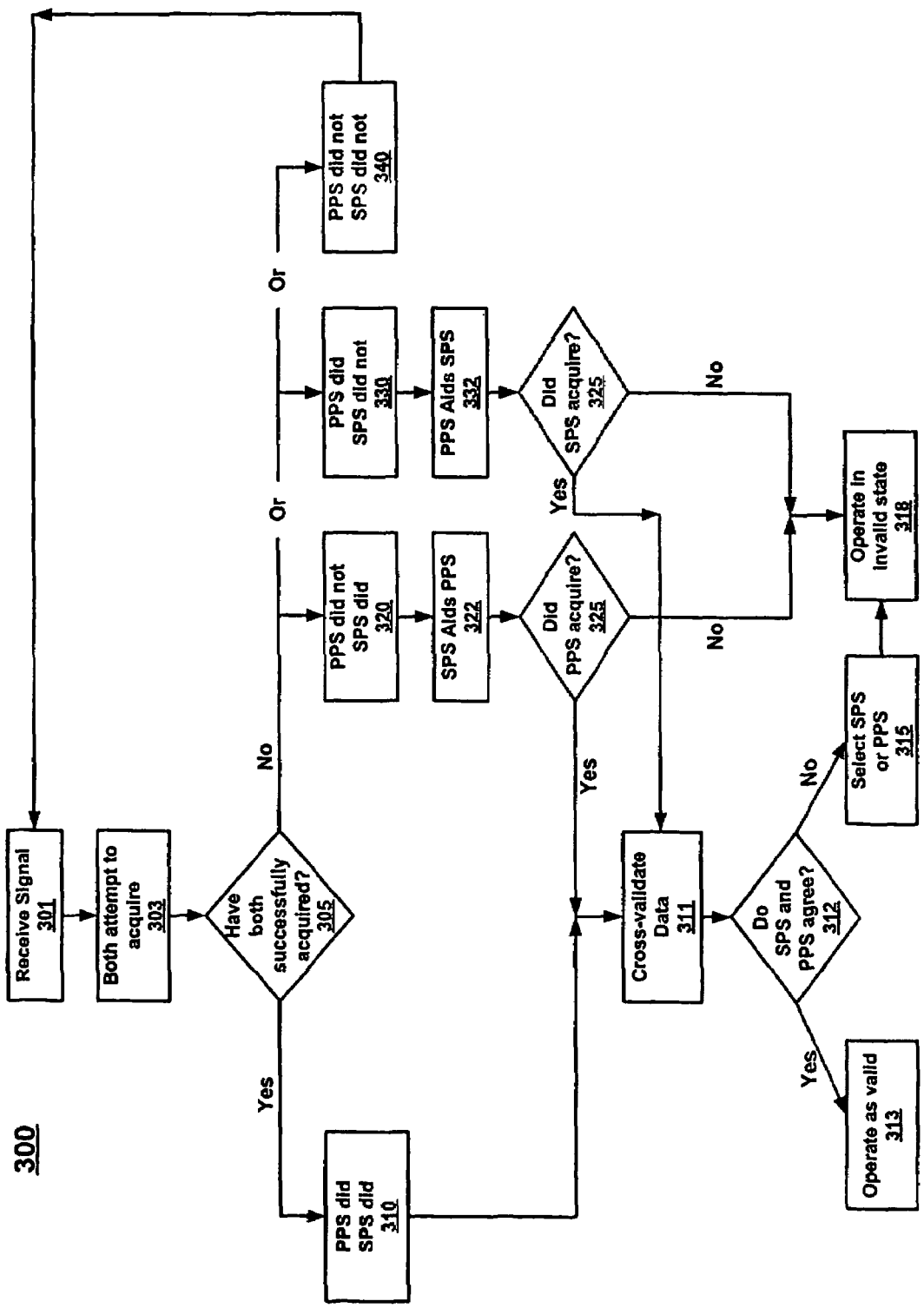
FIG. 3 shows a flow chart of the method for SPS and PPS cooperative operation in accordance with one embodiment of the present invention.

Referring now to FIG. 3, a flowchart 300 of the method for standard positioning service (SPS) and precise positioning service (PPS) cooperative operation is shown in accordance with one embodiment of the present invention. In general, embodiments of the present invention allow a user to utilize the more advanced aspects of a civilian (SPS) GPS receiver while maintaining the accuracy of the DoD (PPS) GPS receiver. Specifically, due to the advances in the civilian GPS receiver market, many implementations of GPS capabilities (e.g., land survey, aviation, location, interactive maps, two antenna blade control systems for machine control, differential capable systems that utilize multiple differential sources such as Coast Guard, L-band, radio link, and the like) are available in a more technically advanced form in an SPS receiver than in a PPS receiver. However, in some cases the positioning signals normally accessed by an SPS receiver may be malfunctioning, jammed, spoofed, unavailable, or the like. Under these conditions the PPS receiver (which is capable of full L1/L2 operation as well as operating in a cryptographic mode) may provide data for extended use by the SPS application. When both receivers are functioning, the raw data received by the SPS and PPS receivers may be compared to ensure that both receivers are receiving the same information.

In addition to seeing more GPS devices, the PPS receiver also maintains a higher anti-jamming/interference suppression, and anti-spoofing capability than that of the SPS receiver. Furthermore, as described herein, the PPS receiver has full access to the L2 band and protected data, while the SPS receiver may access only the L1 band. The use of GPS as the format for providing the positioning signal is merely for purposes of brevity and clarity. The present invention is well suited for utilization with any device or network which provides a positioning signal (e.g., GLONASS, WAAS, Galileo, or the like).

In one embodiment, cross-validation may be used to ensure that the SPS receiver is not being spoofed. For example, a non-friendly positioning signal (e.g., spoofing signal, purposely-wrong signal, or malfunctioning device signal) may be being broadcast. This signal may be able to correctly mimic the C/A code to throw the accuracy of the SPS receiver off. In a worse case, the non-friendly signal may completely stop the SPS receiver from acquiring its position at all. However, a PPS receiver may be able to utilize its cryptographic capabilities, better positioning signal reception, and the P(or Y) code to correctly locate itself. Therefore, by cross-validating the raw data (or the pseudo ranges, or any of the other data fields described herein) between the two receivers the non-friendly signal may be identified, isolated and removed from the SPS receiver's data set.

For example, the PPS receiver may track the PPS service positioning signals and provide data aiding to a commercial SPS receiver. This may aid the SPS receiver in many phases of operation including the prevention from tracking intentionally or unintentionally erroneous GPS signals (e.g., GPS like signals with any combination of identical or invalid pseudo-random code, navigation message, received signal strength, and carrier/code Doppler rates from transmitters or repeaters). In the military marketplace, intentional generation of these erroneous positioning signals is called "spoofing," and this mitigation functionality is referred to herein as anti-spoofing.

The PPS receiver (based on its own processing capability or based on information provided by a host system with access to trusted data) provides integrity and data in the form of a "track list" providing a list of satellite identification, code/carrier value, Doppler rates, received signal quality (C/No or equivalent), jamming signal strength, other tracking data, and track history for valid GPS signals that the SPS receiver should track. In addition, the PPS receiver provides integrity and data in the form of a "do not track list" providing the same information for invalid GPS signals that the SPS receiver should not track. The PPS receiver may also provide any other GPS data or signal information acquired from the PPS receiver which may be used to aid the SPS receiver in many phases of operation. The SPS receiver may then process the integrity data to ensure that it is not processing invalid GPS signals.

Thus, the method for cross-validating PPS and SPS receivers provides combined performance, functionality, and integrity that may not be available in either stand-alone SPS or PPS receivers. For example, a PPS receiver often does not provide as much functionality (e.g., RTK,) or the level of performance provided by commercial survey, machine control, or civil aviation SPS receiver. In addition, by cross-validating the data of the SPS receiver with that of the PPS receiver, the provision of anti-spoofing capabilities from the PPS receiver may allow the use of the SPS receiver to operate in an environment in which anti-spoofing functionality is a requirement. For example, the increased level of integrity may be used to reduce possible harm to human life if invalid GPS signals are used (e.g., civil aviation).

With reference now to step 301 of FIG. 3, a positioning signal is received. In one embodiment, the positioning signal may be comprised of P-code, C/A code, and/or Y-code contained on an L1 band and/or an L2 band.

With reference now to step 303 of FIG. 3, in one embodiment both receivers attempt to acquire. That is, both the PPS receiver and the SPS receiver attempt to acquire the positioning signal. The attempt to acquire may be from a cold start (e.g., no accurate time, position, or velocity information), a warm start (partially accurate initialization information), or a hot start (very accurate initialization information).

In one embodiment, the initialization of the receivers refers to position, velocity, time, and data (PVT). The starting state (e.g., cold, warm, or hot) may be a function of how recently the receiver has been used. For example, if the last use was in the same general area and utilized the same GPS satellites as the present use, then the acquisition time may be much faster than for a receiver that has not been utilized in the same area or within the same time frame.

With reference now to step 305 of FIG. 3, after an amount of time has passed since receiving the positioning signal, both the SPS and the PPS receivers may or may not have successfully acquired the positioning signal. In general, there are four possibilities. Both the PPS receiver and the SPS receiver have acquired, the PPS receiver has not acquired but the SPS receiver has, the PPS receiver has acquired but the SPS receiver has not, or neither the SPS receiver nor the PPS receiver have acquired the data in the positioning signal.

Referring now to step 310 of FIG. 3, both the PPS receiver and the SPS receiver have acquired the positioning signal. In general, once a receiver has initially acquired the GPS positioning signal, the receiver will perform a self-validation to ensure that it is running correctly and that the GPS data allows for proper operation.

With reference now to step 311 of FIG. 3, once they have both successfully acquired, the receivers (e.g., SPS and PPS) then cross-validate the data. That is, they compare their individual databases to ensure that they are both receiving correlating data. For example, the data may be compared at the level of the 1500 bit navigation message (e.g., raw data). That is, the PPS and the SPS receivers may compare their 1500 bit navigation messages from each satellite (or other devices delivering the GPS, or GLONASS or WAAS positioning signal) to ensure they are both receiving the same data.

Referring now to step 312 of FIG. 3, in one embodiment the SPS portion of data and PPS portion of data are compared for agreement purposes. For example, they may be compared at the level of the 1500 bit navigation message, or any other level described in more detail herein. In one embodiment, the cross-validation of data may occur constantly. In another embodiment, the cross-validation of data may occur in a cyclic manner. For example, depending on the need for timely integrity data, the PPS receiver could be cycled on and off periodically to save power. In addition, the SPS receiver may also incorporate logic to periodically wake up the PPS receiver based on time, mode, or GPS signal tracking history (e.g., significant change in received positioning signal strength, appearance of a satellite not previously tracked by the PPS receiver as listed in the "track list", or the like).

With reference now to step 313 of FIG. 3, if the SPS and PPS data from the receivers are in agreement (e.g., cross-validation has been successful), both receivers remain operational and the use of PPS receiver for validation and SPS receiver for operational uses has been performed. In this case, the user may utilize both the SPS and the PPS in their valid states.

However, with reference now to step 315 of FIG. 3, in one embodiment if there is a discrepancy found during the cross-validation process, the default may be the PPS data being flagged as more valid than the SPS data. In this case, the PPS data may be provided to the SPS receiver.

This default may be due to the collection of the PPS data occurring through a layered protection scheme. For example, the PPS receiver incorporates the Y-code tracking capability (which is harder to spoof) through the military cryptography function. Furthermore, the PPS receiver obtains the GPS navigation message from the Y-code tracking thereby authenticating its validity. The PPS receiver may also employ over-determined PVT solutions, receiver autonomous integrity monitoring (RAIM), and/or Fault Detection and Exclusion (FDE) to identify GPS positioning signals that are not consistent with other positioning signals being tracked. In addition, the PPS receiver may employ early-to-prompt acquisition and periodic re-search to identify multi-path and repeaters. The PPS receiver may also be provided to the combined system with the ability to compute autonomous GPS PVT in the presence of higher jamming levels than the SPS receiver can handle by itself. The PPS receiver may further provide a direct measurement of ionospheric delay from the L1/L2 measurement capability that can be used by the SPS receiver in its own processing, instead of using the SPS iono model or other iono estimates determined solely from SPS means. In addition, the PPS integrity/search bin data allows the SPS receiver to directly acquire the positioning signal without searching or to narrow its search window, thereby reducing the acquisition/reacquisition time and extending the "hold" threshold for SPS tracking. For example, the PPS receiver may track through an intermittent jammer/interference source while the SPS receiver loses track. The integrity/search bin data may also speed up the integer ambiguity resolution time.

Therefore, the SPS data may be held as suspect in its origin and overwritten by the PPS data on the SPS receiver. The overwrite may occur on a GPS device by GPS device basis or on a complete data overwrite basis. For example, if a single GPS device is providing an errant positioning signal to the SPS receiver, the PPS receiver may inform the SPS receiver to ignore the errant positioning signal and operate without the erroneous positioning signal. However, if the SPS receiver cannot operate correctly with the data it is receiving, then the complete navigation data from the PPS receiver may be utilized by the SPS receiver. Thus, even though the SPS receiver cannot obtain the navigation data on its own, the SPS receiver will still maintain operational capabilities thereby allowing a user to have complete access to the necessary software and hardware.

In addition, if the data from the SPS receiver is shown as being suspect, a further analysis of the SPS data may include a GPS device by GPS device analysis to see which GPS device is transmitting the suspect data. This analysis of suspect data may result in the recognition of a "spoofing" GPS device or a non-operational device which may be providing one or more false 1500 bit navigation messages to the SPS receiver.

In another embodiment, if the compared data (e.g., SPS data and PPS data) is not the same then no position may be provided by the SPS receiver until it has been updated by the cryptographically confirmed PPS receiver. In yet another embodiment, if the compared data (e.g., SPS data and PPS data) is not the same then an indicator may be utilized to inform the user of the possibility of incorrect data and that the PVT data may not be relied upon (e.g., suspect). For example, the warning may be a colored light (e.g., red-warning, green-good), a blinking light, a flashing display, or the like which would gain the attention of the user utilizing the SPS receiver.

With reference now to step 318 of FIG. 3, the invalidated SPS receiver may force the user to consciously select the PVT data as unreliable data with only limited capabilities. For example, a position may be obtained but without an integrity check. In one embodiment, the use of consciously selected unreliable data may be necessary because PPS data may be more difficult to acquire than SPS data. For example, PPS and SPS receivers are in a different location and the PPS receiver is being blocked, or the PPS cryptographic data is invalid, or the like.

However, if the PPS receiver is supplying information to the SPS receiver due to a degradation of the SPS receiver reception, then the transfer of data may be performed at a classified or unclassified level. At the unclassified level, the raw data or uncorrected pseudo range from the PPS receiver may be passed to the SPS receiver without classification problems. At the classified level, data that has passed through the cryptography of the PPS receiver and is then passed to the SPS receiver may require the SPS receiver to also be classified. For example, if the SPS receiver receives classified data from the PPS receiver (e.g., due to the inability of the SPS receiver to acquire a positioning signal, or a correct positioning signal, or jamming, or the like) then the SPS receiver must also be treated as a cryptographic device and must be treated with the same level of security as the PPS receiver delivering the classified data.

With reference again to step 305 of FIG. 3, if the PPS receiver has acquired but the SPS receiver has not acquired then step 330 occurs. In one embodiment, the lack of SPS receiver positioning signal acquisition may be due to jamming, spoofing, lack of power, or the like.

Referring now to step 332 of FIG. 3, once the PPS receiver is operational and has self-validated, the PPS receiver may then begin aiding the SPS receiver by feeding data to the SPS receiver. This transfer of data from the PPS receiver may occur at any of the plurality of subsystems of the SPS and PPS receivers as described herein (e.g., FIG. 4). For example, the PPS receiver may provide the SPS receiver with unclassified raw data or pseudo range variables to help the SPS receiver operate.

For example, the PPS receiver may provide the SPS receiver with classified (or unclassified) PVT data which may allow the SPS receiver to be operational without actually acquiring the data for itself. In yet another embodiment, the PPS receiver may provide the SPS receiver with other classified or unclassified data which may allow the SPS receiver to be operational while it continues trying to acquire its own data.

In addition to delivering data to the SPS receiver, the PPS receiver. and/or SPS receiver may analyze the possible causes for the inability of the SPS receiver to acquire. This analysis may result in the identification of the spoofing or jamming device or any other number of reasons why the SPS receiver may not be acquiring. It may also provide the SPS receiver. with the correct places to look for the signal from the GPS device. For example, if the PPS receiver has been in the location for an amount of time and the SPS receiver is new to the area, the PPS receiver may be able to provide the SPS receiver with a hot load (e.g., up-to-date satellite locations and strengths, accurate position, velocity and time) thereby enhancing the acquisition speed of the SPS receiver. In the prior art, if an SPS receiver could not acquire, the user would be without PVT results. In addition, the actual reason for the inability of acquisition for the SPS receiver may not be resolved and the user of the SPS receiver would be without an operational receiver.

With reference now to step 335 of FIG. 3, a check is performed to see if the SPS receiver has acquired. In one embodiment, if the SPS receiver does acquire then, as described herein (e.g., step 311), the PPS receiver and the SPS receiver cross-validate to ensure the data that is being utilized is valid. And the process continues as described from step 311 of cross-validation.

However, as described herein (e.g., step 318), if the SPS receiver does not acquire, the user may have the option of feeding the information from the PPS receiver to the SPS receiver in order to make the SPS receiver operational. Furthermore, as described herein, the data fed from the PPS receiver to the SPS receiver may be classified or unclassified The resulting SPS and PPS receiver collaboration may then skip the cross-validate step (e.g., 311) and operate in an invalid state. Specifically, there is no way to cross-validate the data if there is only one set of data. Although, in one embodiment, if the PPS data is shown as a reliable data set during the self validation process, the data may be treated as valid by the SPS receiver, at the user's option.

With reference again to step 305 of FIG. 3, if the SPS receiver has acquired but the PPS receiver has not acquired then step 320 occurs. In one embodiment, this lack of PPS receiver positioning signal acquisition may be due to lack of quality initialization data, jamming, spoofing, lack of power, incorrect cryptographic material, or the like, wherein the PPS receiver fails to acquire.

Referring now to step 322 of FIG. 3, in one embodiment, once the SPS receiver is operational and has self-validated, the SPS receiver may then begin aiding the PPS receiver by feeding data to the PPS receiver. This transfer of data from the SPS receiver may occur at any of the plurality of subsystems of the SPS and PPS receivers as described herein (e.g., FIG. 4). For example, the SPS receiver may provide the PPS receiver with PVT data, raw data or pseudo range variables to help the PPS receiver acquire.

In one embodiment, the SPS receiver may provide the PPS receiver with PVT data which may allow the PPS receiver to be operational without actually acquiring the data for itself. In yet another embodiment, the SPS receiver may provide the PPS receiver with other data which may allow the PPS receiver to be partially operational while it continues trying to acquire its own data.

In addition to delivering the positioning signal data to the PPS receiver, the SPS receiver and/or PPS receiver may analyze the possible causes for the inability of the PPS receiver to acquire. This analysis may result in the identification of the spoofing or jamming device or any other number of reasons why the PPS receiver may not be acquiring. It may also provide the PPS receiver with the correct places to look for the satellites. For example, if the SPS receiver has been in the location for an amount of time and the PPS receiver is new to the area, the SPS receiver may be able to provide the PPS receiver with a hot load (e.g., up-to-date satellite locations and strengths) thereby enhancing the acquisition speed of the PPS receiver. In the prior art, if a PPS receiver could not acquire, the user would be without PVT results. In addition, the actual reason for the inability of acquisition for the PPS receiver may not be resolved.

Referring now to step 325 of FIG. 3, in one embodiment if the PPS receiver does acquire then, as described herein (e.g., step 311), the PPS receiver and the SPS receiver cross-validate to ensure the data that is being utilized is valid, and the process continues as described from the step of cross validation 311.

However, if the PPS receiver does. not acquire, the user may have the option of feeding the information from the SPS receiver to the PPS receiver in order to make the PPS receiver operational. Furthermore, as described herein, the resulting collaboration of the receivers may then skip the cross-validate step and operate. Specifically, there is no way to cross-validate the data if there is only one set of data. However, since the PPS data is the more reliable data set during the cross-validation, the data may be treated as suspect by both the SPS and PPS receivers.

With reference again to step 305 of FIG. 3, if both the SPS receiver and the PPS receiver have not acquired then step 340 occurs. That is, both receivers continue trying to acquire the data. This may go on ad infinitum or until the receivers are turned off. In another embodiment, a user may be able to put in initialization information in order to aid the SPS and PPS receivers in acquiring. For example, if a map is available, the user may put in latitude/longitude values, grid coordinates, or the like, to help the PPS or SPS receiver locate itself. In addition, a user may be able to input information regarding a spoofing positioning signal, bad positioning signal, GPS device to ignore, or the like, which may further allow the SPS and/or PPS receivers to acquire. In another embodiment, a third GPS device may be found which can supply. the necessary data to the SPS or PPS receivers in order to help the SPS or PPS receivers acquire.

Figure 4:
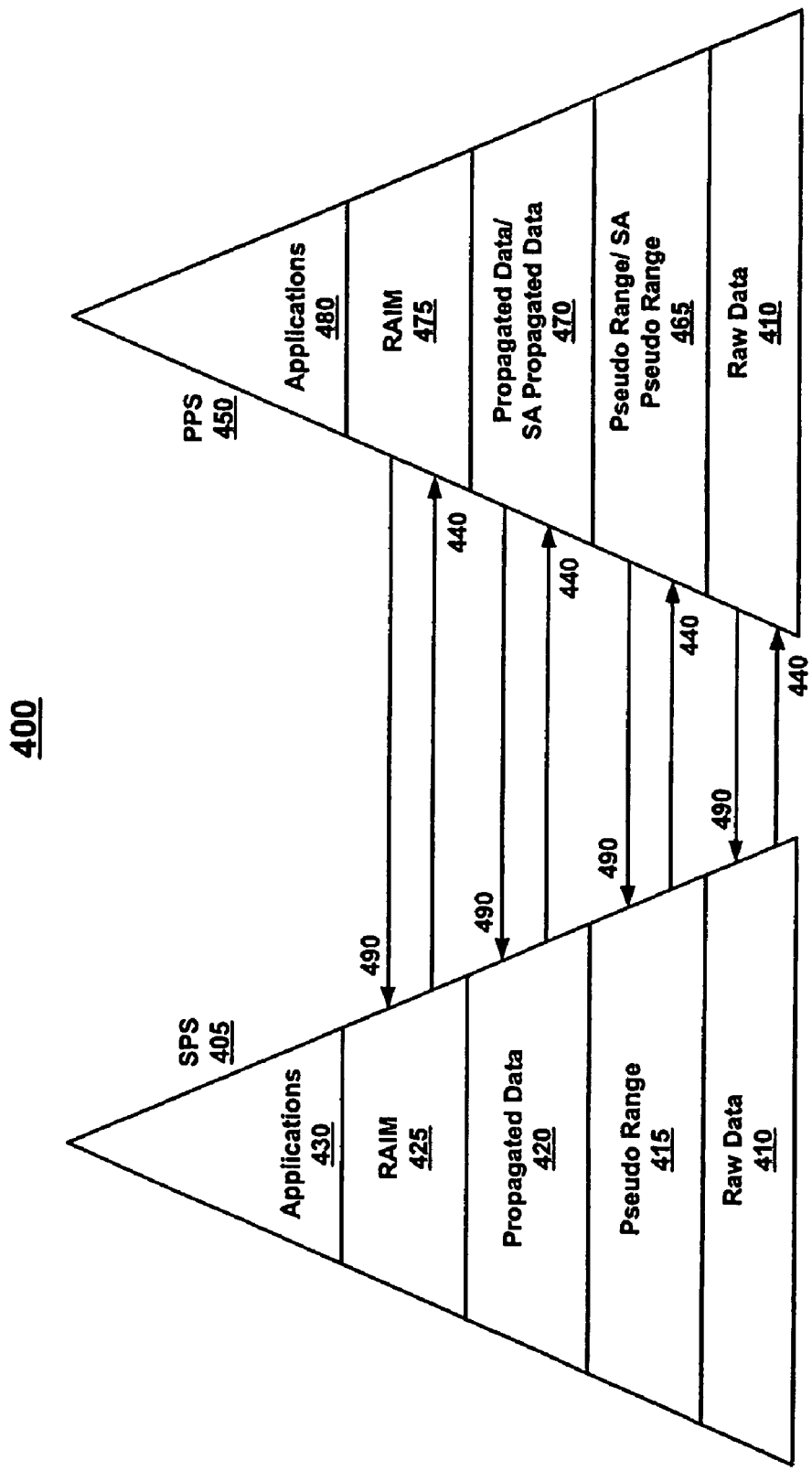
FIG. 4 illustrates one embodiment of the levels of possible SPS and PPS cooperative operation in accordance with one embodiment of the present invention.

With reference now to FIG. 4, the levels of possible SPS and PPS cooperative operation is shown in accordance with one embodiment of the present invention. As described herein, the interaction between the SPS and PPS receivers may be at a variety of levels and occur for a variety of time durations. For example, if the SPS receiver is unable to acquire but the PPS receiver has acquired (e.g., step 330 of FIG. 3), then the PPS receiver 450 may provide raw data 410 (e.g., the 1500 bit navigation message) to the SPS receiver 405 via communications channel 490. The outputting of raw data 410 from PPS receiver 450 may continue until one or both receivers are turned off, or until the SPS receiver 405 is able to acquire its own raw data 410.

In the same manner, if SPS receiver 405 has acquired and PPS receiver 450 has not (e.g., step 320 of FIG. 3), then the SPS receiver 405 may provide raw data 410 (e.g., the 1500 bit navigation message) to the PPS receiver 450 via communications channel 440. As stated herein, the outputting of raw data 410 from SPS receiver 405 may continue until one or both receivers are turned off, or until the PPS receiver 450 is able to acquire its own raw data 410. In one embodiment, communications channels 490 and 440 may be wired or wireless communications capabilities. For example, communications channels 490 and 440 may be bluetooth, Infrared, USB, standard cable, copper wire, speaker-microphone, or the like which may be capable of passing a positioning signal from one receiver to another.

Although in the example stated herein, the PPS receiver 450 and the SPS receiver 405 pass data at the raw data 410 level, each receiver may pass the data from the positioning signal at a variety of levels. For example, the data may be passed from the SPS receiver 405 at the pseudo range 415 level, the propagated data 420 level, or the receiver autonomous integrity monitor (RAIM) 425 level. ID addition, the data may be passed from the PPS receiver 450 at the pseudo range 465 level, the propagated data 470 level, or the receiver autonomous integrity monitor (RAIM) 475 level. However, as stated herein, at different levels of the PPS receiver 450, the positioning signal data that is being passed may be classified. If the data being passed from PPS receiver 450 is classified (e.g., SA or CVAS) then the SPS receiver 405 will become a classified receiver to the same level as the PPS data being passed. This changing classification level only applies to the SPS receiver however, since no data initially processed by the SPS receiver 405 and passed to the PPS receiver 450 is classified.

Figure 5:
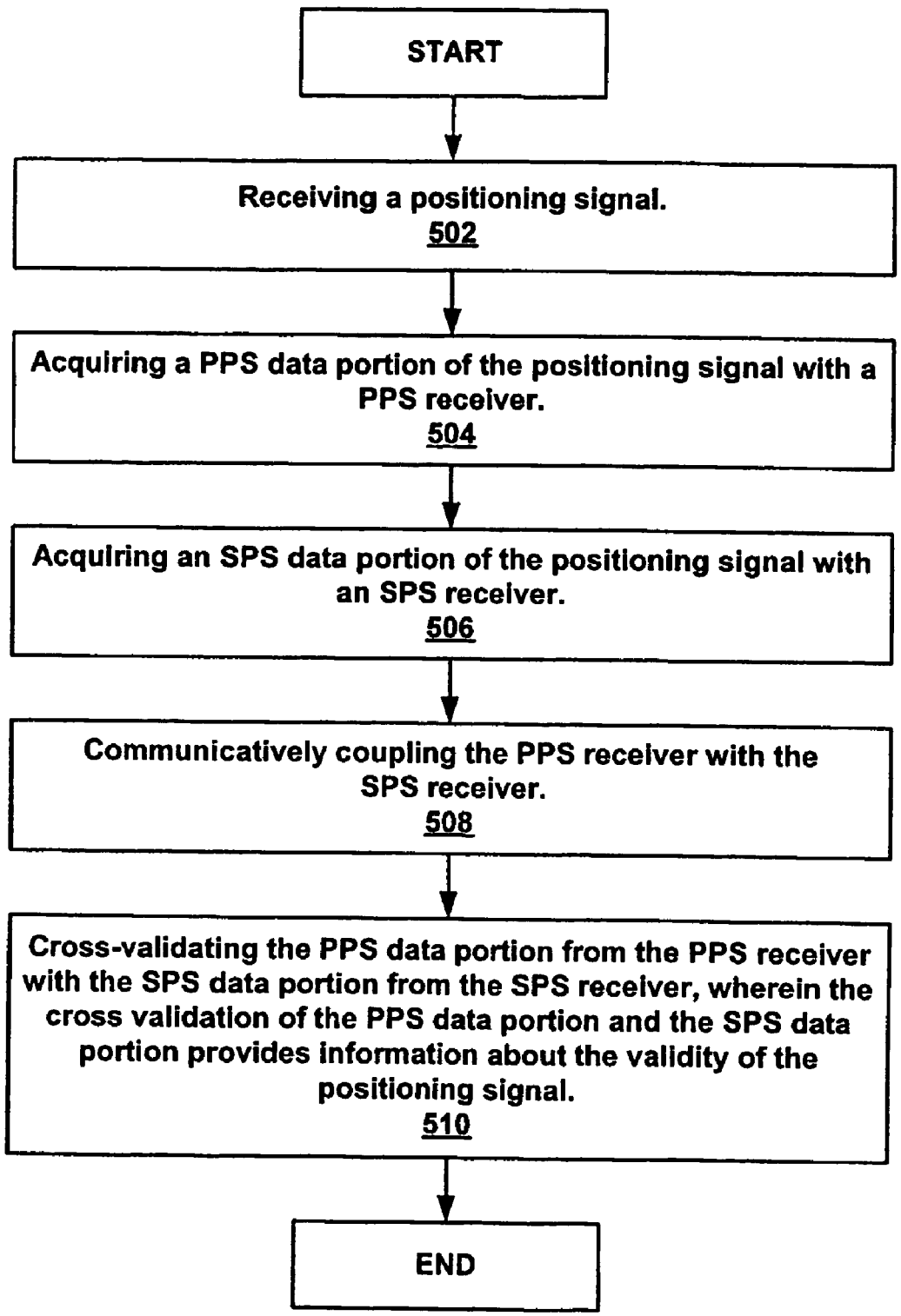
FIG. 5 is a flow chart of the method for standard positioning service and precise positioning service cooperative operation in accordance with one embodiment of the present invention.

With reference now to FIG. 5, a flow chart of the method for SPS and PPS cooperative operation is shown in accordance with one embodiment of the present invention.

With reference now to step 502 of FIG. 5, in one embodiment a positioning signal is received. As stated herein, the positioning signal may be from a satellite based device, or the signal may be from a GPS device placed in line of sight (or GLONASS or WAAS). For example, if an area has low or weak satellite coverage, an Earth based positioning signal generator (pseudolite) may be utilized to distribute the previously described positioning signal. The Earth based positioning signal generator may be a land or sea type device and may be portable or stationary. As described herein, the positioning signal may be broadcast on two frequencies, L1 at 1575.42 MHz and L2 at 1227.60 MHz. Furthermore, the positioning signal may include the C/A code and/or the P-code (as stated herein, when encrypted, the P-code becomes the Y-code).

Referring now to step 504 of FIG. 5, a PPS data portion of the positioning signal is acquired with the PPS receiver. As described herein, the PPS receiver is capable of receiving the positioning signal on both the L1 band and the L2 band. In addition, the PPS receiver includes a security module to receive a CV (crypto variable) from an external keying device. That is, the PPS receiver having a correct CV is capable of accessing the C/A code, the P-code, and the encrypted Y-code.

With reference now to step 506 of FIG. 5, an SPS data portion of the positioning signal is acquired with the SPS receiver. As described herein, the SPS receiver is capable of receiving the full positioning signal only on the L1 band. In addition, the SPS receiver does not include a security module That is, the SPS receiver is only capable of accessing the CA, or P-code not the P-code, but not the encrypted Y-code.

Referring now to step 508 of FIG. 5, in one embodiment the PPS receiver is communicatively coupled with the SPS receiver. As stated herein, the communicatively coupling may be performed by wired or wireless methods. For example, the wired method may utilize a cable plugged into both the PPS receiver and the SPS receiver. The wireless method may use bluetooth protocol, Infrared, speaker-microphone, or any other wireless method available to one skilled in the art of wireless communications. In addition, the communicatively coupling of the SPS receiver with the PPS receiver may be manually initiated or it may be automatically initiated. For example, in one embodiment, once one receiver acquires the positioning signal it may begin to communicatively couple with the other receiver. In another embodiment, the receiver may await a positioning signal from a user before it begins to try to communicatively couple with another receiver.

With reference now to step 510 of FIG. 5, the PPS data portion from the PPS receiver may be cross-validated with the SPS data portion from the SPS receiver. By cross-validating the data from the SPS and the PPS receivers, information may be provided about the validity of the positioning signal. For example, as shown in FIG. 4, the raw data 410 may be compared to ensure that both receivers are receiving the same information. This type of cross-validation may be necessary to ensure that the SPS receiver is not being spoofed. For example, a non-friendly positioning signal (e.g., spoofing signal, purposely-wrong signal; or malfunctioning device signal) may be being broadcast by a GPS device. This non-friendly positioning signal may be able to correctly mimic the C/A code to throw the accuracy of the SPS receiver off. In a worse case, the non-friendly positioning signal may completely stop the SPS receiver from acquiring its position at all. However, a PPS receiver having a higher security classification than the SPS receiver may be able to utilize its cryptographic capabilities, better signal reception, and the P(or Y)-code to correctly locate itself. Therefore, by cross-validating the raw data 410 or the pseudo ranges 415 and 465 (or any of the other data fields described herein) between the two receivers the non-friendly positioning signal may be identified and ignored. In addition, the receivers may signal a user or other users of the non-friendly device and ensure that other receivers are not confused by the non-friendly positioning signal.

In one embodiment, during the cross-validating of the PPS data portion with the SPS data portion, the PPS data portion may be selected as the correct data portion if the cross-validating does not agree. This selection of the PPS data over the SPS data is due to the cryptographic capabilities utilized during the formation of the PPS data. In another embodiment, during the cross-validation process, if there is disagreement, as shown in step 315 of FIG. 3, the user may be informed of the incongruity of the data and may select either the PPS receiver or the SPS receiver as having the most correct data. In so doing, the user will then know that the operation of either the SPS receiver or the PPS receiver is being done in a suspected state.

Figure 6:
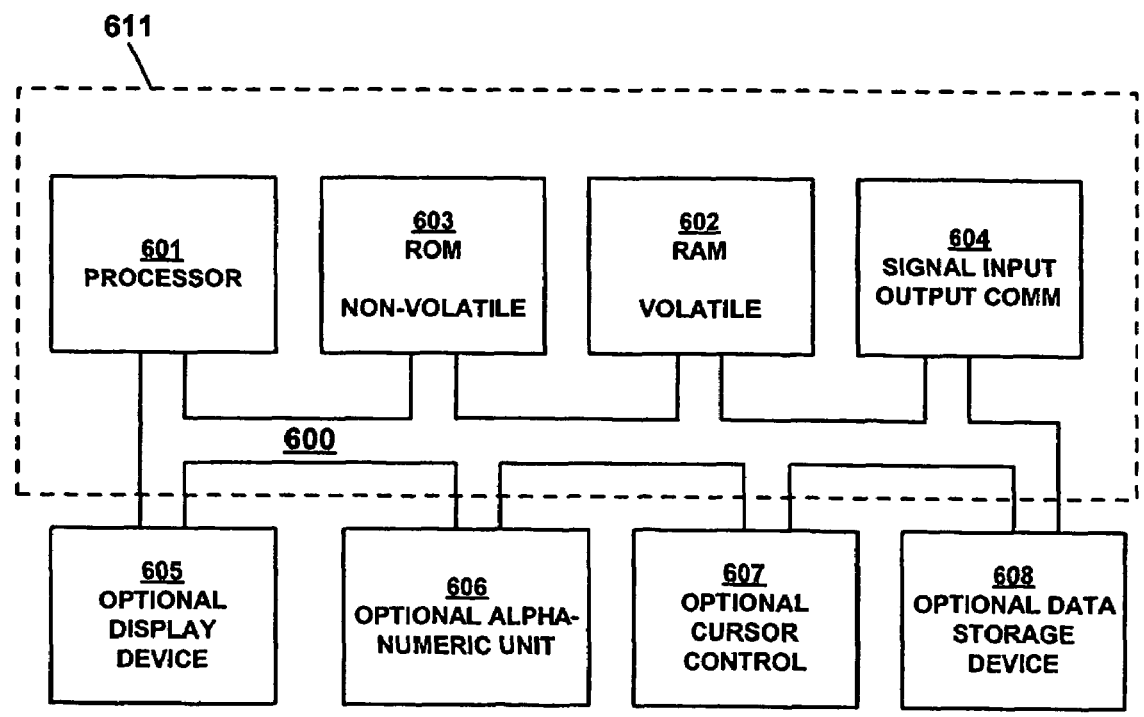
FIG. 6 shows a computer system in accordance with one embodiment of the present invention.

Referring now to FIG. 6, a diagram of computer system 611 in accordance with one embodiment of the present invention is shown in greater detail. Within the discussions herein, it should be noted that certain processes and steps are discussed that are realized, in one embodiment, as a series of instructions (e.g., software program) that reside within computer readable memory units of system 611 and executed by processor 601 of system 611. When executed, the instructions cause the computer system 61i to perform specific functions and exhibit specific behavior as described.

In general, computer system 611 used by the present invention comprises an address/data bus 600 for communicating information, one or more central processors 601 coupled with the bus 600 for processing information and instructions, a computer readable volatile memory unit 602 (e.g., random access memory, static RAM, dynamic, RAM, etc.) coupled with the bus 600 for storing information and instructions for the central processor(s) 601, a computer readable non-volatile memory unit 603 (e.g., read only memory, programmable ROM, flash memory, EPROM, EEPROM, etc.) coupled with the bus 600 for storing static information and instructions for the processor(s) 601. System 611 also includes a mass storage computer readable data storage device 608 such as a magnetic or optical disk and disk drive coupled with the bus 600 for storing information and instructions. Optionally, system 611 can include a display device 605 coupled to the bus 600 for displaying information to the computer user (e.g., maintenance technician, etc.), an alphanumeric input device 606 including alphanumeric and function keys coupled to the bus 600 for communicating information and command selections to the central processor(s) 601, a cursor control device 607 coupled to the bus for communicating user input information and command selections to the central processor(s) 601, and a signal generating device 604 coupled to the bus 600 for communicating command selections to the processor(s) 601.

Thus, the present invention provides a method for SPS and PPS cooperative operation. Embodiments of the present invention also provide a method for SPS and PPS cooperative operation which allows the better applications of the civilian SPS receiver to operate in the DoD environment of the PPS receiver. Embodiments of the present invention further provide a method which provides these advantages without compromising accuracy, integrity, or security.

In broad summary, this writing has disclosed a method for standard positioning service (SPS) and precise positioning service (PPS) cooperative operation. In one embodiment, a positioning signal is received. A PPS data portion of the positioning signal is acquired with a PPS receiver. An SPS data portion of the positioning signal is acquired with an SPS receiver. The PPS receiver and the SPS receiver are then communicatively coupled. The PPS data portion from the PPS receiver is then cross-validated with the SPS data portion from the SPS receiver, wherein the cross validation of the PPS data portion and the SPS data portion provides. information about the validity of the positioning signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the Claims appended hereto and their equivalents.

What is claimed is:

1. A method for standard positioning service (SPS) and precise positioning service (PPS) cooperative operation comprising:
   receiving a positioning signal;
   acquiring a PPS data portion of the positioning signal with a PPS receiver;
   acquiring a SPS data portion of the positioning signal with an SPS receiver;
   communicatively coupling the PPS receiver with the SPS receiver; and
   cross validating the PPS data portion from the PPS receiver with the SPS data portion from the SPS receiver, wherein the cross validation of the PPS data portion and the SPS data portion provides information about the validity of the positioning signal.

2. The method of claim 1 wherein the SPS receiver does not include a KDP (key data processor).

3. The method of claim 1 wherein the PPS receiver has a higher security classification level than the SPS receiver.

4. A method for standard positioning service (SPS) and precise positioning service (PPS) cooperative operation comprising:
   receiving a positioning signal;
   acquiring a SPS data portion of the positioning signal with an SPS receiver; and
   outputting a portion of the SPS data portion;
   receiving the portion of the SPS data portion with a PPS receiver;
   processing the portion of the SPS data portion within the PPS receiver to provide operational capabilities for the PPS receiver during non-acquirable operation of the PPS receiver; and
   operating the PPS in a standalone state.

5. The method as recited in claim 4 further comprising:
   acquiring a PPS data portion of the positioning signal with a PPS receiver.

6. The method as recited in claim 5 further comprising:
   cross-validating the PPS data portion from the PPS receiver with the SPS data portion from the SPS receiver, wherein the cross validation of the PPS data portion and the SPS data portion provides information about the validity of the positioning signal.

7. The method of claim 4 wherein the SPS data portion of the positioning signal is C/A code.

8. The method of claim 5 wherein the PPS data portion of the positioning signal is P-code or encoded Y-code.

9. The method of claim 6 wherein during the cross-validating of the PPS data portion with the SPS data portion, the PPS data portion is selected as the correct data portion if the cross-validation does not agree.

10. The method of claim 4 wherein the PPS receiver includes a functioning security module.

11. The method of claim 4 wherein the PPS receiver utilizes the portion of the SPS data portion to assist the PPS receiver in acquiring the PPS data portion of the positioning signal.

12. A method for encrypted and unencrypted cooperative operation comprising:

receiving at least two positioning signals;
acquiring an encrypted data portion from a first positioning signal with an encrypted receiver;
acquiring an unencrypted data portion from a second positioning signal with an unencrypted receiver;
communicatively coupling the encrypted receiver with the unencrypted receiver; and
cross-validating the encrypted data portion from the encrypted receiver with the unencrypted portion from the unencrypted receiver, wherein the cross-validation of the encrypted data portion and the unencrypted data portion provides information about the validity of the positioning signal.

13. The method of claim 12 further comprising:
receiving said unencrypted data portion from a second positioning signal selected from the group of signal providers consisting of: a global positioning system (GPS) signal, a Galileo signal, a Globalnaya Navigatsionnay Sputnikovaya Sistema (GLONASS) signal and a wide area augmentation system (WAAS) signal.

14. The method of claim 12 further comprising:
receiving said encrypted data portion from a first positioning signal selected from the group of signal providers consisting of: a global positioning system (GPS) signal, a Galileo signal, a Globalnaya Navigatsionnay Sputnikovaya Sistema (GLONASS) signal and a wide area augmentation system (WAAS) signal.

15. The method of claim 12 further comprising:
utilizing said encrypted receiver to aid the unencrypted receiver in acquiring said second positioning signal.

16. The method of claim 15 further comprising:
providing a hot load from said encrypted receiver to said unencrypted receiver to aid the unencrypted receiver in acquiring said second positioning signal.

17. The method of claim 15 further comprising:
cycling off said encrypted receiver periodically after said encrypted receiver aids said unencrypted receiver in acquiring said second positioning signal.

18. The method of claim 12 further comprising:
evaluating said first position signal from said unencrypted receiver;
evaluating said second position signal from said encrypted receiver;
selecting portions of the first position signal and the second position signal based on the quality of said position signal; and
combining said selected portions of the first position signal and the second position signal to provide a combined performance, functionality and integrity navigation characteristics.

19. The method of claim 12 further comprising:
utilizing the unencrypted receiver to provide the first position information to said encrypted receiver; and
utilizing the capabilities of the encrypted receiver without the encrypted receiver actually acquiring the data for itself.

20. The method of claim 12 further comprising:
utilizing the encrypted receiver to provide the second position information to said unencrypted receiver; and
utilizing the capabilities of the unencrypted receiver without the unencrypted receiver actually acquiring said first position information.

21. The method of claim 12 further comprising:
utilizing said unencrypted receiver to aid the encrypted receiver in acquiring said first positioning signal.

22. The method of claim 21 further comprising:
providing a hot load from said unencrypted receiver to said encrypted receiver to aid the encrypted receiver in acquiring said first positioning signal.

23. The method of claim 12 further comprising:
utilizing a third receiver to aid the encrypted receiver in acquiring said first positioning signal or the unencrypted receiver in acquiring said second positioning signal.

24. The method of claim 12 further comprising:
providing a user selection option for allowing a user to select either the unencrypted receiver or the encrypted receiver for navigation operation.

25. A method for secure and open cooperative operation comprising:
receiving at least two positioning signals;
acquiring a secure data portion from a first positioning signal with a secure receiver;
acquiring an open data portion from a second positioning signal with an open receiver;
communicatively coupling the secure receiver with the open receiver; and
cross-validating the secure data portion from the secure receiver with the open portion from the open receiver, wherein the cross-validation of the secure data portion and the open data portion provides information about the validity of the positioning signal.

26. The method of claim 25 further comprising:
receiving said secure data portion from a Galileo positioning signal; and
receiving said open data portion from a GPS positioning signal.

27. The method of claim 25 further comprising:
utilizing said secure receiver to aid the open receiver in acquiring said second positioning signal.

28. The method of claim 27 further comprising:
providing a hot load from said secure receiver to said open receiver to aid the open receiver in acquiring said second positioning signal.

29. The method of claim 27 further comprising:
cycling off said secure receiver periodically after said secure receiver aids said open receiver in acquiring said second positioning signal.

30. The method of claim 25 further comprising:
evaluating said first position signal from said open receiver;
evaluating said second position signal from said secure receiver;
selecting portions of the first position signal and the second position signal based on the quality of said position signal; and
combining said selected portions of the first position signal and the second position signal to provide a combined performance, functionality and integrity navigation characteristics.

31. The method of claim 25 further comprising:
utilizing the open receiver to provide the first position information to said secure receiver; and
utilizing the capabilities of the secure receiver without the secure receiver actually acquiring the data for itself.

32. The method of claim 25 further comprising:
utilizing the secure receiver to provide the second position information to said open receiver; and
utilizing the capabilities of the open receiver without the open receiver actually acquiring said first position information.

33. The method of claim 25 further comprising:
utilizing said open receiver to aid the secure receiver in acquiring said first positioning signal.

34. The method of claim 33 further comprising:
providing a hot load from said open receiver to said secure receiver to aid the secure receiver in acquiring said first positioning signal.

35. The method of claim 25 further comprising:
utilizing a third receiver to aid the secure receiver in acquiring said first positioning signal or the open receiver in acquiring said second positioning signal.

36. The method of claim 25 further comprising:
providing a user selection option for allowing a user to select either the open receiver or the secure receiver for navigation operation.

37. The method of claim 25 further comprising:
receiving said secure data signal in an encrypted format.

38. A system for unencrypted and encrypted cooperative operation comprising:
an encrypted receiver to process an encrypted data portion of a first positioning signal; and
an unencrypted receiver to process an unencrypted data portion of a second positioning signal, wherein the encrypted receiver and the unencrypted receiver are communicatively coupled such that the encrypted data portion from the encrypted receiver is cross validated with the unencrypted data portion from the unencrypted receiver thereby corroborating the accuracy of either the first positioning signal or the second positioning signal.

39. The system of claim 38 wherein said encrypted data portion is received from a second positioning signal selected from the group of signal providers consisting of: a global positioning system (GPS) signal, a Galileo signal, a Globalnaya Navigatsionnay Sputnikovaya Sistema (GLONASS) signal and a wide area augmentation system (WAAS) signal.

40. The system of claim 38 wherein said encrypted data portion is received from a first positioning signal selected from the group of signal providers consisting of: a global positioning system (GPS) signal, a Galileo signal, a Globalnaya Navigatsionnay Sputnikovaya Sistema (GLONASS) signal and a wide area augmentation system (WAAS) signal.

41. The system of claim 38 wherein said encrypted receiver is utilized to aid the unencrypted receiver in acquiring said second positioning signal.

42. The system of claim 41 wherein a hot load is provided from said encrypted receiver to said unencrypted receiver to aid the unencrypted receiver in acquiring said second positioning signal.

43. The system of claim 41 wherein said encrypted receiver is periodically turned on and off after said encrypted receiver aids said unencrypted receiver in acquiring said second positioning signal.

44. The system of claim 38 further comprising:
a first position evaluator for evaluating said first position signal from said unencrypted receiver;
a second position evaluator for evaluating said second position signal from said encrypted receiver;
a selector for selecting portions of the first position signal and the second position signal based on the quality of said position signal; and
a data combiner for combining said selected portions of the first position signal and the second position signal to provide a combined performance, functionality and integrity navigation system.

45. The system of claim 38 wherein the unencrypted receiver provides the first position information to said encrypted receiver, such that the capabilities of the encrypted receiver can be accessed without the encrypted receiver actually acquiring the first positioning signal.

46. The system of claim 38 wherein the encrypted receiver provides the second position information to said unencrypted receiver, such that the capabilities of the unencrypted receiver can be accessed without the unencrypted receiver actually acquiring the second positioning signal.

47. The system of claim 38 wherein the unencrypted receiver aids the encrypted receiver in acquiring said first positioning signal.

48. The system of claim 47 wherein a hot load is provided from said unencrypted receiver to said encrypted receiver to aid the encrypted receiver in acquiring said first positioning signal.

49. The system of claim 38 further comprising:
a third receiver to aid the encrypted receiver in acquiring said first positioning signal or the unencrypted receiver in acquiring said second positioning signal.

50. The system of claim 38 further comprising:
a user selection option for allowing a user to select either the unencrypted receiver or the encrypted receiver for navigation operation.

51. A system for clear and secure cooperative operation comprising:
a secure receiver to process an secure data portion of a first positioning signal; and
a clear receiver to process an clear data portion of a second positioning signal, wherein the secure receiver and the clear receiver are communicatively coupled such that the secure data portion from the secure receiver is cross validated with the clear data portion from the clear receiver thereby corroborating the accuracy of either the first positioning signal or the second positioning signal.

52. The system of claim 51 wherein said secure data portion is received from a Galileo positioning signal and said clear data portion is received from a GPS positioning signal.

53. The system of claim 51 wherein said secure receiver is utilized to aid the clear receiver in acquiring said second positioning signal.

54. The system of claim 53 wherein a hot load is provided from said secure receiver to said clear receiver to aid the clear receiver in acquiring said second positioning signal.

55. The system of claim 53 wherein said secure receiver is periodically turned on and off after said secure receiver aids said clear receiver in acquiring said second positioning signal.

56. The system of claim 51 further comprising:
a first position evaluator for evaluating said first position signal from said clear receiver;
a second position evaluator for evaluating said second position signal from said secure receiver;
a selector for selecting portions of the first position signal and the second position signal based on the quality of said position signal; and
a data combiner for combining said selected portions of the first position signal and the second position signal to provide a combined performance, functionality and integrity navigation system.

57. The system of claim 51 wherein the clear receiver provides the first position information to said secure receiver, such that the capabilities of the secure receiver can be accessed without the secure receiver actually acquiring the first positioning signal.

58. The system of claim 51 wherein the secure receiver provides the second position information to said clear receiver, such that the capabilities of the clear receiver can be accessed without the clear receiver actually acquiring the second positioning signal.

59. The system of claim 51 wherein the clear receiver aids the secure receiver in acquiring said first positioning signal.

60. The system of claim 58 wherein a hot load is provided from said clear receiver to said secure receiver to aid the secure receiver in acquiring said first positioning signal.

61. The system of claim 51 further comprising:
a third receiver to aid the secure receiver in acquiring said first positioning signal or the clear receiver in acquiring said second positioning signal.

62. The system of claim 51 further comprising:
a user selection option for allowing a user to select either the clear receiver or the secure receiver for navigation operation.

\* \* \* \* \*